United States Patent Office 2,891,045
Patented June 16, 1959

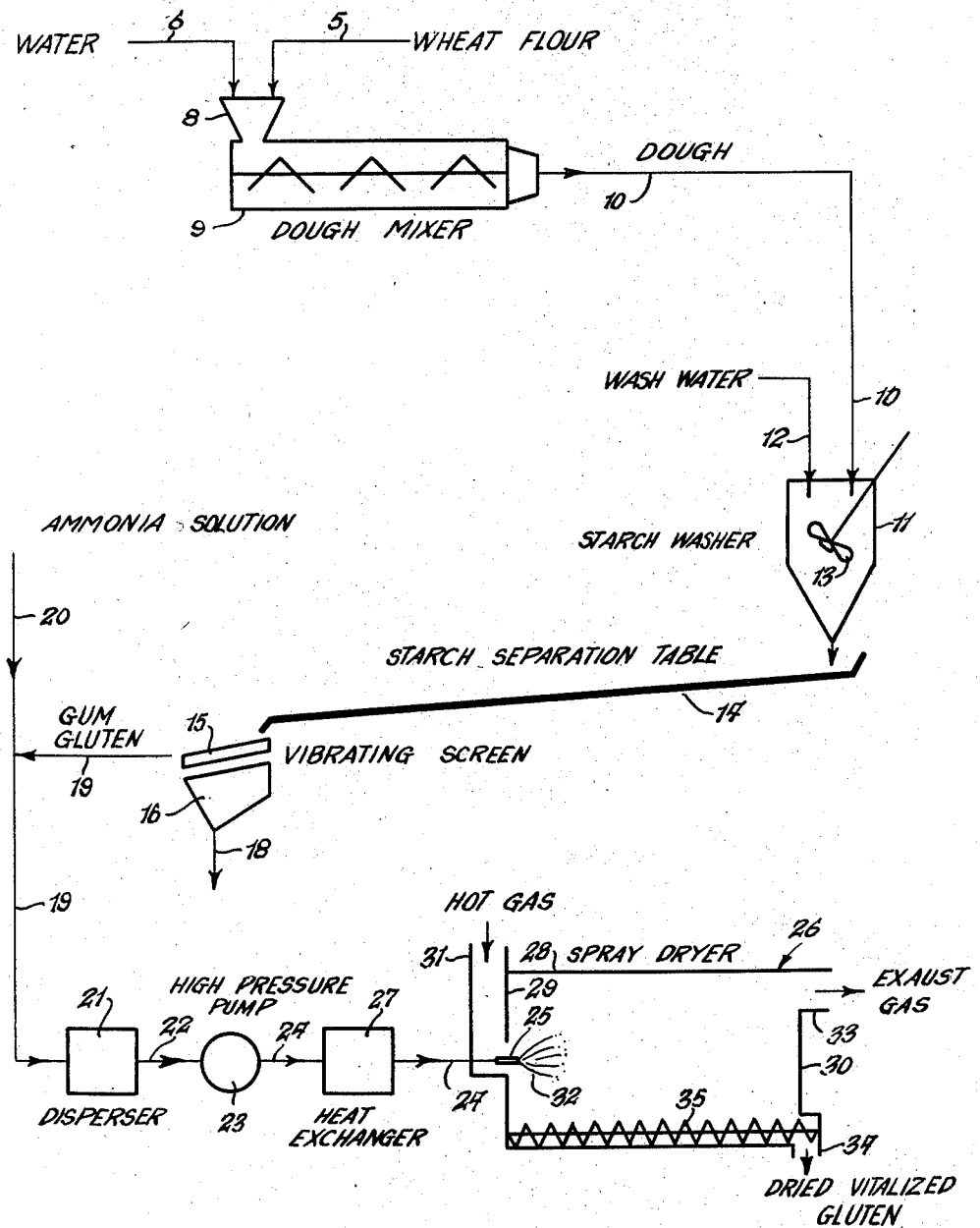

2,891,045

METHOD OF DRYING GLUTEN

Duncan B. Montgomery, West Seneca, and James G. Moore, Buffalo, N.Y., assignors to Blaw-Knox Company, Pittsburgh, Pa., a corporation of Delaware Application February 19, 1957, Serial No. 641,141

2 Claims. (Cl. 260—112)

This invention relates to a method of drying gluten and more particularly to the production of active or vitalized gluten by spray drying.

In the production of starch, of both the refined and unrefined grades, from whole wheat grain flour, secondary products must be removed during the processing techniques. Dry milled wheat flour, prior to any starch recovery process has an average composition of between 72 –75% starch
7 –13% protein
0.4– 0.7% ash with the remaining being moisture and small amounts of natural sugars, fats, enzymes and other organic components. For practical purposes the protein content may be considered gluten and while the gluten present in the wheat flour is relatively small compared to the amount of starch, it exerts a very pronounced influence on the character of the products made from the flour, as well as on the method of separation in refining the starch.

Gluten in its active or vitalized form is a tough, elastic substance, extremely sticky and gelatinous in nature, of a grayish color, which becomes brown and brittle on drying and is found in the flour of wheat and other grains. Through the application of heat, either at relatively low temperatures for a prolonged period of time or at relatively high temperatures for a short period of time, the gluten becomes inactive or devitalized, losing its elasticity and becoming water insoluble somewhat like a hard boiled egg.

Since the demand for starch in various forms is extensive and since for most applications the removal of gluten is necessary in the preparation of the refined starch, extensive surveys have been made of the markets available for the most economic use of this by-product.

Basically the major gluten markets today resolve themselves into two categories, either for active or vitalized gluten or inactive or devitalized gluten. The largest market for the active or vitalized gluten is as a protein additive for breakfast cereals; in reincorporation into baking flours; and in the manufacture of so-called gluten bread for diabetics. There are other uses for the active or vitalized gluten but they are minor as compared with the demand in the cereal and baking industries. The inactive or devitalized gluten today is mostly used for the manufacture of monosodium glutamate. The active or vitalized gluten commands a much higher price than the inactive or devitalized gluten and the present invention is concerned with the production of the active or vitalized gluten.

Starch and gluten are now separated by several processes, one being the so-called "dough" process herein illustrated, another being a so-called "batter" process wherein the starch and gluten are initially produced as a slurry, and a third being a caustic process where the gluten is dissolved and the dissolved gluten later precipitated as globules. The present invention is applicable to drying gluten produced by any of these methods. With any of these methods the gluten is recovered as gum gluten containing about 30–40% solids and 70–60% moisture. In this form it is an extremely gummy, almost liver-like, sticky mass, extremely difficult to handle. Present processing methods for this material involve either atmospheric drum drying, which results in an inactive or devitalized product, or low temperature vacuum shelf drying and grinding, which results in the active or vitalized product.

The principal object of the present invention is to produce a uniformly high quality spray dried active or vitalized gluten in the form of discrete particles.

Another object is to produce such dried gluten with no apparent denaturalization or degradation of the vitality, solubility or other quality of the gluten, the dried product of the present invention being capable, on being wetted, of going back to its rubbery form with no apparent loss of elasticity.

Another object of the invention is to produce a stable free-flowing dispersion of gluten particles in water which can be easily pumped and sprayed in the form of very fine droplets from a nozzle without danger of the gluten particles adhering to one another or clotting to form pieces which will clog the nozzle and without danger of the gluten particles building up on the surfaces of the lines through which the aqueous dispersion is passed. This principal object is achieved by the introduction of ammonia into the aqueous gluten mixture prior to, during or subsequent to the final dispersion step prior to spray drying.

Another object is to produce such a dispersion which can be permitted to stand for a long period of time without evidence of settling, stratification, or agglomeration of the dispersed gluten particles.

Another object is to produce a high quality of active or vitalized gluten in controlled, uniform fine particle size.

Another object is to spray dry at such low temperatures, for such short time and with such uniform particle size of the gluten to be dried as to avoid degradation or devitalization of any substantial part of the product, particularly as to smaller particles thereof.

Another important object is to produce such active or vitalized gluten in the form of a grayish white free flowing powder free from foreign odor or taste.

Another object is to provide such a process which is not particularly critical and which is continuous in operation and requires little supervision.

Another object is to provide such a process which is applicable to all conventional processes for producing starch and gluten.

Other objects and advantages of the invention will be apparent from the following description and drawing in which the figure is a diagrammatic representation of apparatus for producing starch and vitalized or active gluten from wheat flour in accordance with the invention by a so-called "dough" process.

While the invention is also applicable where the starch and gluten are initially produced as a slurry and also to the process where the gluten is initially dissolved in true solution by caustic and the gluten later precipitated as globules, the accompanying drawing illustrates apparatus suitable for carrying out the invention wherein the starch and gluten are produced by the so-called "dough" process, that is, the wheat flour is first made into dough from pieces of which the starch is washed, the solids constituting the gluten which are recovered by the practice of the present invention.

A feed 5 of wheat flour and a feed 6 of water are introduced into the hopper 8 of a dough mixer 9 where the flour and water are kneaded into a dough with about 40% of its weight of water. After standing for an hour or more to hydrate the gluten the dough is cut into large lumps. These are kneaded and flow, as indicated at 10, into a washing tank 11. Wash water is introduced into the washing tank 11 from pipe 12 and an agitator 13 is immersed in the washing tank to break up the dough into relatively small pieces and to separate the starch therefrom. The discharge from the washing tank 11 is onto the head or elevated end of a conventional starch separation table 14 on which the starch settles to the bottom of the table from which it is removed at intervals. From the tail end of the starch separation table the wash water and small pieces of gum gluten are discharged onto a vibrating screen 15 through which the wash water passes into a vat or pan 16 from which it is withdrawn at 18.

The gum gluten in the form of small, elastic, extremely sticky gelatinous pieces having a composition of approximately 30–40% solids and 70–60% moisture, travels down the vibrating screen 15 and passes from its tail end through a line 19.

The important feature of the invention is the introduction of water and ammonia to produce an ammoniated slurry so that the subsequent dispersion step is effective in bringing the gluten to the required small particle size for spray drying and in maintaining these particles in stable dispersion and free from tendency to clot or form into strings until the ammonia and water are driven off in the spray dryer and the gluten is reduced to a discrete dry powder. The water and ammonia are shown as introduced from a line 20, the quantity of water being such as to produce a water-gluten mixture in the order of from about 8–10% gluten solids and the amount of ammonia being added being such as to adjust this mixture to about pH 9.5–11. Since in commercial processing some starch adheres to the gluten particles, this concentration of gluten results in a higher concentration of total solids. However, so far as the present invention is concerned, the essential factor is the concentration of gluten solids.

The ammoniated slurry is then passed into a disperser 21 which can be of any suitable form, such as a hydraulic shear disperser, colloid mill or agitator, to reduce the small pieces of gum gluten to the required small particle size. During and following such reduction and dispersion the particles of gluten are prevented from adhering or clotting to one another by the presence of the ammonia which insures that each particle remains independently in dispersion in the water as long as the ammonia is present.

The ammoniated slurry or dispersion of gum gluten particles in water from the disperser 21 passes through a line 22 leading to the inlet of a high pressure pump 23. The discharge conduit 24 from this pump, which could also include a heat exchanger 27, connects with the nozzle 25 of a horizontal spray dryer indicated generally at 26. The temperature of the slurry discharged from the nozzle 25 can be from room temperature to 120° F. The spray dryer comprises a horizontal shell 28 having an end head 29 at its wet end adjacent the nozzle 25 and an end head 30 at its opposite or dry end. Hot air or gas at a temperature of from about 400°–500° F. is introduced through the end head 29 from an inlet 31 in surrounding relation to the spray 32 from the nozzle 25. This temperature is reduced by evaporation so that the average spray chamber temperature, at the center of the shell 28, is from about 190°–210° F. The moist air or gas escapes through an exhaust duct 33 in the end head 30 at a temperature of from about 180°–200° F. The water and ammonia are rapidly evaporated from the droplets forming the spray 32 and containing the dispersed particles of gluten. These particles dry as independent or discrete particles and settle to the bottom of the shell 28 where they are removed as a fine grayish white dry powder, without apparent loss of any vitality, solubility or quality, through an outlet spout 34 by a conveyor screw 35. By reducing the gluten to a uniform particle size in 21 and preventing clotting of these particles by the presence of the ammonia, the product is of uniformly high quality. With too great a variation in the size of the particles of gum gluten sprayed into the dryer, the small particles would burn and be devitalized if the dryer temperature were adjusted to the larger size gluten particles and if this temperature were adjusted to the smaller size gluten particles, the larger size particles would be sticky.

While the temperature of the entering gas and even the average temperature of the spray chamber 28 is high and well in excess of the temperature, namely about 140° F., at which devitalization of gum gluten takes place, the gluten particles are subjected to these temperatures only for a short length of time and only while they are still evaporating moisture so that the gluten particles themselves never reach these high temperatures but remain at such low temperatures as to avoid degradation of the gluten. In this connection it will be seen that by drying the gluten particles in a horizontal spray dryer, the gluten particles settle by gravity from the hot gas stream, this being before the gluten particles can reach a devitalizing temperature and accordingly the overall effect is one of low temperature drying.

As a specific example of spray drying an ammoniated slurry or dispersion of gluten the concentration of the dispersion to the nozzle 25 was 9.2% gluten solids; the delivery pressure of the pump 23 was maintained between 4200 to 4500 p.s.i.; the average temperature of the spray chamber 28 was maintained between 165° to 190° F.; and the dried gluten was produced as a vitalized grayish white fine powder having a moisture content of 7.5% and a bulk density of 42.5 pounds per cubic foot.

From the foregoing it will be seen that by adding ammonia as a dispersing agent and reducing the gluten to uniform particle size the gluten can be produced as a high quality vitalized or active spray dried powder in contrast to the laborious, slow and costly low temperature vacuum shelf drying now employed.

We claim:

1. The method of producing dried vitalized solids from gum gluten, which comprises combining water, ammonia and particles of gum gluten to provide an ammoniated aqueous slurry having a pH in the order of 9.5–11, said ammonia acting to maintain said gluten particles in stable dispersion and free from tendency to clot and form into strings, propelling a moving stream of gas capable of absorbing moisture, heating said stream of gas to a temperature of between about 400° to 500° F., spraying droplets of said ammoniated slurry into said stream of heated gas, and removing the gluten resulting from the evaporation of said droplets before the temperature of the gluten rises to the temperature at which devitalization takes place.

2. The method set forth in claim 1 wherein said stream of gas is propelled horizontally and wherein the removal of said gluten from said stream of gas is by gravity.

References Cited in the file of this patent

UNITED STATES PATENTS

| | | |
|---|---|---|
| 1,316,854 | Ostenberg | Sept. 23, 1919 |
| 1,658,078 | Dickerson | Feb. 7, 1928 |
| 2,431,417 | Obey | Nov. 25, 1947 |
| 2,797,212 | Miley et al. | June 25, 1957 |

FOREIGN PATENTS

| | | |
|---|---|---|
| 708,806 | Great Britain | May 12, 1954 |

OTHER REFERENCES

Shewfelt et al.: Canadian Chemistry and Process Industries, July 1944, pp. 502, 519.